(12) United States Patent
Eaves

(10) Patent No.: US 6,351,782 B1
(45) Date of Patent: Feb. 26, 2002

(54) METHOD OF SHARING AN I/O DEVICE BETWEEN A HOST OPERATING SYSTEM AND A FOREIGN OPERATING SYSTEM IN A SINGLE COMPUTER

(75) Inventor: David Reid Eaves, Mission Viejo, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/273,046

(22) Filed: Mar. 19, 1999

(51) Int. Cl.⁷ .......................... G06F 13/14; G06F 13/20
(52) U.S. Cl. ................................ 710/72; 710/8; 710/9; 710/105; 711/112; 709/213; 709/301
(58) Field of Search ................................ 709/301, 213; 710/105, 9, 8, 72; 711/112

(56) References Cited

U.S. PATENT DOCUMENTS

| | | | |
|---|---|---|---|
| 5,414,851 A | * 5/1995 | Brice, Jr. et al. | 395/650 |
| 5,557,740 A | * 9/1996 | Johnson et al. | 395/183.14 |
| 5,600,805 A | * 2/1997 | Fredericks et al. | 395/825 |
| 5,845,130 A | * 12/1998 | Goff et al. | 395/728 |
| 5,996,024 A | * 11/1999 | Blumenau | 709/301 |
| 6,161,104 A | * 12/2000 | Stakutis et al. | 707/10 |

* cited by examiner

Primary Examiner—Thomas Lee
Assistant Examiner—Rehana Perveen
(74) Attorney, Agent, or Firm—Charles J. Fassbender; Mark T. Starr; Lise A. Rode

(57) ABSTRACT

An I/O device is shared between a host operating system, and a foreign operating system that runs under the host operating system, in a single computer. The I/O device must be of a type which includes a port driver that receives device commands for reading addressable fields on a removable data storage media. Each media which is to be a source of data for the host operating system stores a first identifier in a particular addressable field, and each media which is to be a source of data for the foreign operating system stores a second identifier in a particular addressable field. A registry in the host operating system indicates that the I/O device is to be used exclusively by the host operating system; so the host will try to use the I/O device. But in addition, a different private registry in the foreign operating system indicates how that operating system can address the I/O device; so the foreign operating systems will also try to use the I/O device. Each time the host operating system attempts to use the I/O device, it looks for the first identifier on the storage media; and it terminates its attempt if the first identifier is not found. Each time the foreign operating system attempts to use the I/O device, it looks for the second identifier on the storage media; and it terminates its attempt if the second identifier is not found.

15 Claims, 6 Drawing Sheets

FIG. 5

TYPICAL TEN-BYTE CDB

|        | bit 7 | bit 6 | bit 5 | bit 4 | bit 3 | bit 2 | bit 1 | bit 0 |
|--------|-------|-------|-------|-------|-------|-------|-------|-------|
| byte 0 | OPERATION CODE ||||||||
| byte 1 | LOGICAL UNIT NUMBER ||| RESERVED |||||
| byte 2 | (MSB) |||||||  |
| byte 3 | LOGICAL BLOCK ADDRESS (IF REQUIRED) ||||||||
| byte 4 |  |||||||  |
| byte 5 |  ||||||| (LSB) |
| byte 6 | RESERVED ||||||||
| byte 7 | (MSB) | TRANSFER LENGTH (IF REQUIRED) |||||||
| byte 8 | PARAMETER LIST LENGTH (IF REQUIRED)<br>ALLOCATION LENGTH (IF REQUIRED) ||||||| (LSB) |
| byte 9 | CONTROL BYTE ||||||||

FIG. 6

```
typedef struct_SCSI_PASS_THROUGH_DIRECT{
    USHORT Length;
    UCHAR ScsiStatus;
    UCHAR PathId;
    UCHAR TargetId;
    UCHAR Lun;
    UCHAR CdbLength;
    UCHAR SenseInfoLength;
    UCHAR DataIn;
    ULONG DataTransferLength;
    ULONG TimeOutValue;
    PVOID DataBuffer;
    ULONG SenseInfoOffset;
    UCHAR Cdb[16];
}SCSI_PASS_THROUGH_DIRECT
```

FIG. 7

```
typedef struct_SCSI_REQUEST_BLOCK{
    USHORT Length;
    UCHAR Function;
    UCHAR SrbStatus;
    UCHAR ScsiStatus;
    UCHAR PathId;
    UCHAR TargetId;
    UCHAR Lun;
    UCHAR QueueTag;
    UCHAR QueueAction;
    UCHAR CdbLength;
    UCHAR SenseInfoBufferLength;
    UCHAR SrbFlags;
    ULONG DataTransferLength;
    ULONG TimeOutValue;
    PVOID DataBuffer;
    PVOID SenseInfoBuffer;
    struct_SCSI_REQUEST_BLOCK   *NextSrb;
    PVOID OriginalRequest;
    PVOID SrbExtension;
    ULONG QueueSortKey;
    UCHAR Cdb[16];
}SCSI_REQUEST_BLOCK,
```

METHOD OF SHARING AN I/O DEVICE BETWEEN A HOST OPERATING SYSTEM AND A FOREIGN OPERATING SYSTEM IN A SINGLE COMPUTER

BACKGROUND OF THE INVENTION

This invention relates to computers which include a host operating system, and a foreign operating system which runs under the host operating system; and more particularly, it relates to methods of sharing an I/O device between such host operating system and foreign operating system.

In the prior art, a digital computer typically comprises an instruction processor, a digital memory which is coupled to the instruction processor, a host operating system which is stored in the memory, and multiple native application programs which are also stored in the memory and run under the control of the host operating system. This instruction processor executes certain types of object code instructions directly without modification, and the host operating system as well as each native application program is a compilation of those object code instructions.

Also, one of the native application programs can be an emulator program which implements another set of instructions which are foreign to the instruction processor. This is achieved, in the emulator, by providing a respective sequence of object code instructions for each foreign instruction that is to be implemented. Then, for each particular foreign instruction that is to be executed, the corresponding sequence of object code instructions is executed.

When the emulator program is included in the computer, then that emulator can be used to run another operating system and another set of application programs which are a compilation of the foreign instructions. In the prior art, one such computer which includes a native operating system, and emulator, a foreign operating system and foreign application programs is disclosed in U.S. Pat. No. 5,794,011 which is assigned to the assignee of the present application.

Now, from time to time, it is necessary to add/delete particular native application programs which run under the native operating system, and add/delete particular foreign application programs which run under the foreign operating system. To do that, one I/O device can be provided for exclusive use by the native operating system, and another I/O device can be provided for exclusive use by the foreign operating system. But then, the cost of the I/O device is duplicated.

Alternatively, a single I/O device can be provided in the computer which is shared by the native operating system and the foreign operating system. However, in the prior art, the single I/O device was required to be identified in a registry within the host operating system as an I/O device which was used exclusively by either the host operating system or the foreign operating system. Thus, the registry had to be changed whenever the use of the I/O device changed from one operating system to the other. But, the registry is read and acted upon by the host operating system only when the entire host operating system is initially loaded into the memory by an operator; and such loading of the host operating system is a time-consuming manual operation.

Accordingly, a primary object of the present invention is to provide a method of sharing an I/O device between the host operating system and the foreign operating system in which the above drawbacks are overcome.

BRIEF SUMMARY OF THE INVENTION

With the present invention, a method is provided by which an I/O device is shared between a host operating system, and a foreign operating system that runs under the host operating system, in a single computer. To use this invention, the I/O device must be of a type which includes a port driver that receives device commands for reading addressable fields on a removable data storage media. Such an I/O device is shared, via the present invention, by storing a first identifier in a particular addressable field on the removable data storage media if that media is to be used as a source of data for the host operating system; and storing a second identifier in a particular addressable field on the removable data storage media if that media is to be used for a source of data for the foreign operating system. Also, a registry is included in the host operating system which indicates that the I/O device is to be used exclusively by the host operating system; but in addition, a different private registry is included in the foreign operating system which indicates how that operating system can address the I/O device. Due to these two registries, both operating systems will attempt to use the I/O device. Then, each time the host operating system starts to use the I/O device, it tries to find the first identifier on the storage media. If that first identifier is not found, the host operating system terminates its use of the I/O device. Similarly, each time the foreign operating system starts to use the I/O device, it tries to find the second identifier on the storage media, and it terminates its use if the second identifier is not found.

BRIEF DESCRIPTION OF THE DRAWINGS

FIG. 5 shows the details of a typical ten-byte Command_Descriptor_Block which is used in the FIG. 2 process.

FIG. 6 shows the details of a SCSI_Pass_Through_Direct data structure which is used in the FIG. 2 process.

FIG. 7 shows the details of a SCSI_Request_Block which is used in the FIG. 2 process.

DETAILED DESCRIPTION

Figure 1:
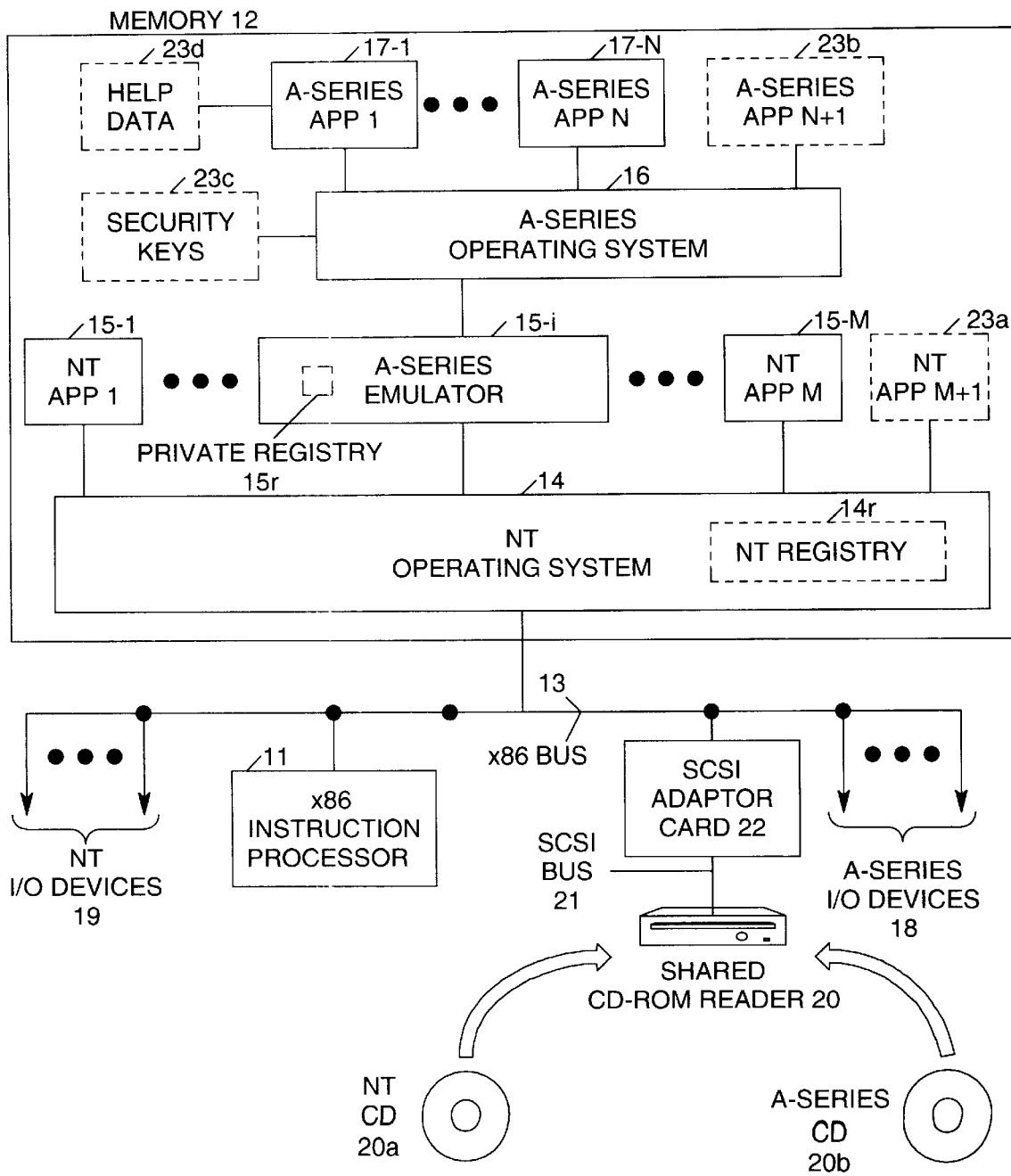
FIG. 1 shows an overview of a digital computer which includes an I/O device that is shared between a host operating system and a foreign operating system, in accordance with the present invention.

Referring now to FIG. 1, a digital computer system which operates in accordance with the present invention will be described. This FIG. 1 digital computer system is comprised of an Intel x86 instruction processor 11 and a digital memory 12 which are interconnected by an x86 bus 13. Stored within the memory 12 are multiple programs which are executed by the x86 instruction processor 11 and which are identified by reference numerals 14, 15-1 thru 15-M, 16, and 17-1 thru 17-N.

Program 14 is a host operating system, such as the Windows NT operating system from Microsoft Corporation. Each program 15-1 thru 15-M is an NT application program which runs under the control of the NT operating system. All of the programs 14 and 15-1 thru 15-M are comprised of x86 object code instructions. These instructions are native to the x86 instruction processor 11 and they are executed directly by that processor without modification.

Program 16 is another operating system, such as the MCP/AS operating system from Unisys Corporation, which is completely foreign to the host operating system. Each program 17-1 thru 17-N is an A-Series application program which runs under the control of the A-Series operating system 16. All of the programs 16 and 17-1 thru 17-N are comprised of A-Series object code instructions. These instructions are foreign to the x86 instruction processor 11 and they cannot be executed directly by that processor.

Program 15-i is an A-Series emulator which implements each A-Series instruction, in the programs 16 and 17-1 thru 17-N, as a sequence of x86 object code instructions. These x86 instructions are executed by the x86 instruction processor 11 to thereby emulate the A-Series instructions.

Also included in the FIG. 1 digital computer system are several I/O devices 18 and 19 which are coupled to the x86 bus 13 and are used exclusively by either the NT operating system 14 or the A-Series operating system 16. All of the I/O devices 18 which are used exclusively by the A-Series operating system 16 are identified in an NT Registry 14r within the NT operating system. This NT registry 14r is read and acted upon by the NT operating system just one time when the NT operating system 14 is loaded into the memory 14. Conversely, if an I/O device is not identified in the NT registry 14r as one which is used exclusively by the A-Series operating system, then that I/O device is used by the NT operating system 14.

Now, in accordance with the present invention, the FIG. 1 system also includes a CD-ROM reader 20 which is shared by both the NT operating system 14 and the A-Series operating system 16. This CD-ROM reader 20 has a SCSI bus interface 21 which is coupled to the x86 bus 13 through a SCSI adapter card 22.

One particular use which the NT operating system 14 has for the CD-ROM reader 20 is to occasionally read an additional NT application program, from an NT formatted CD 20a, that run under the NT operating system. Such an additional NT application program is indicated in FIG. 1 by reference numeral 23a. Similarly, the A-Series operating system 16 uses the CD-ROM reader 20 to occasionally read an additional A-Series application program, from an A-Series formatted CD 20b, that run under the A-Series operating system; and such an application program is indicated in FIG. 1 by reference numeral 23b.

Also, the A-Series operating system 16 uses the CD-ROM reader 20 to read various Security Keys 23c from an A-Series CD 20b. For each Security Key that is read, a corresponding function in the A-Series operating system is enabled; and for each Security Key that is absent, a corresponding function in the A-Series operating system is disabled. In addition, the A-Series operating system 16 uses the CD-ROM reader 20 to read Help Data 23d from an A-Series CD 20b. This Help Data 23d is used to diagnose faults in particular A-Series application programs 17-1 thru 17-N.

Being able to share the CD-ROM reader 20 between the NT operating system 14 and A-Series operating system 16 is highly desirable. Otherwise, if one CD-ROM reader is provided for exclusive use by the NT operating system 14 and another CD-ROM reader is provided for exclusive use by the A-Series operating system 16, then the cost of the CD-ROM reader is duplicated. Alternatively, only a single CD-ROM reader could be provided in the FIG. 1 system, and the NT Registry 14r could be changed each time the use of the CD-ROM reader is changed from the NT-operating system 14 to the A-Series operating system 16, and vice-versa. But, for each such change to be read and acted upon by the NT operating system, the entire NT operating system must be re-loaded by an operator into the memory 14.

To avoid the above drawbacks in the FIG. 1 system, and still share the CD-ROM reader 20 between the two operating systems 14 and 16, the A-Series emulator 15-i stores information about the CD-ROM reader 20 in a private registry 15r. This information in the private registry 15r indicates how the CD-ROM reader 20 can be addressed; and the A-Series operating system uses this information to attempt to read each CD which is mounted in the CD-ROM reader 20. However, the CD-ROM reader 20 is not identified in the NT registry 14r as an I/O device which will be used by the A-Series operating system. Thus, the NT operating system operates as if the CD-ROM reader 20 will be used exclusively by the NT operating system.

Figure 2:
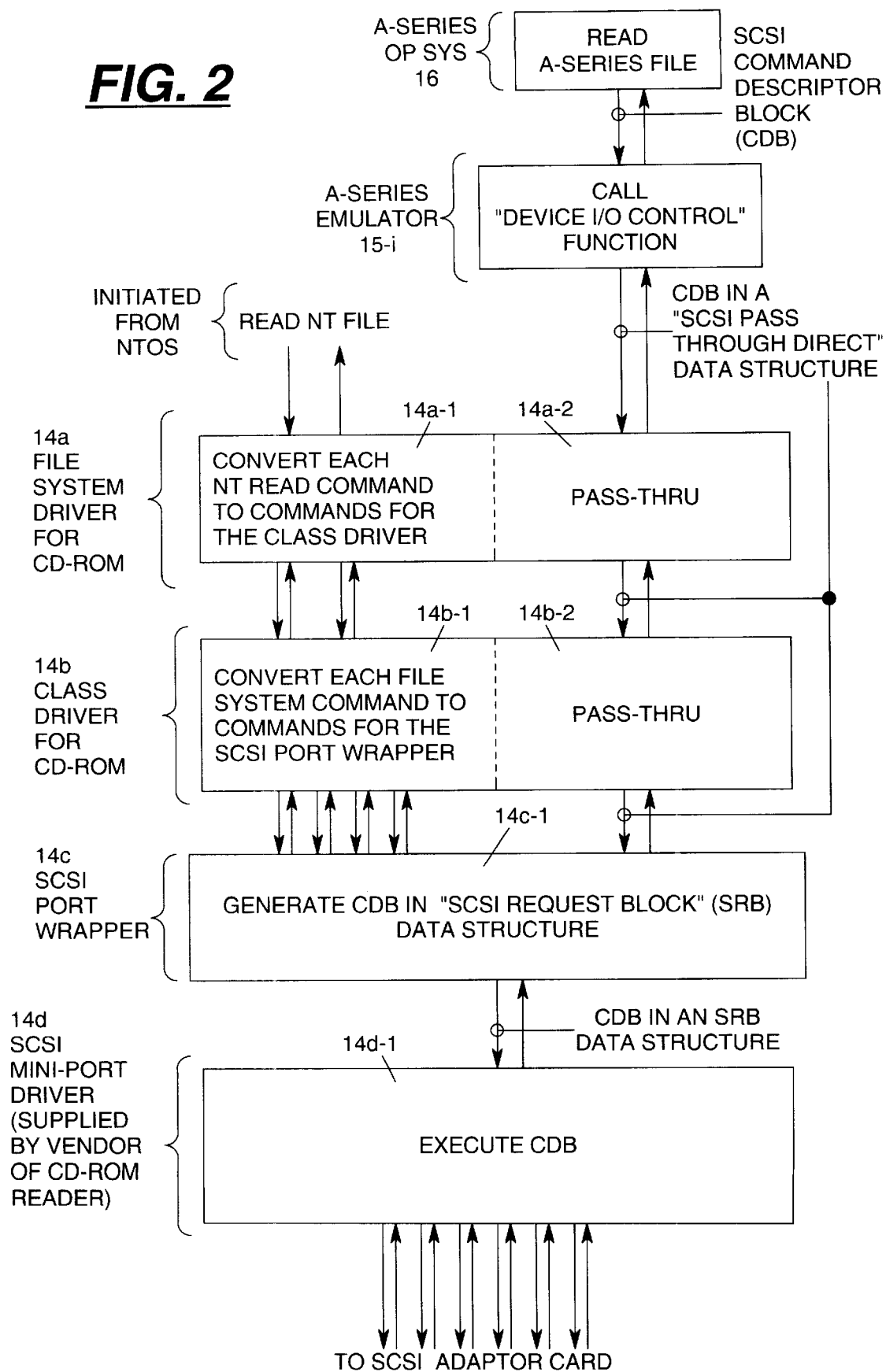
FIG. 2 shows various details of a process by which commands are sent from the host operating system or the foreign operating system in FIG. 1 to the shared I/O device.

Turning next to FIG. 2, it shows various details on how commands are sent to the CD-ROM in the CD-ROM reader 20 from both the NT operating system 14 and the A-Series operating system 16. Included in FIG. 2 are four sub-programs 14a–14d which lie within the NT operating system 14. Sub-program 14a is a File System Driver for the CD-ROM reader 20; sub-program 14b is Class Driver for the CD-ROM reader 20; sub-program 14c is a SCSI Port Wrapper; and sub-program 14d is a SCSI Mini-Port Driver.

File System Driver 14a selectively performs one of two different operations which are indicated by reference numerals 14a-1 and 14a-2. By operation 14a-1, the File System Driver receives a high level READ NT FILE command and converts that command to one or more intermediate level commands which are sent to the Class Driver 14b. In comparison, by operation 14a-2, the File System Driver 14a receives a Command Descriptor Block (CDB) which is a low level command that is defined by the SCSI Mini-Port Driver 14d. This CDB is contained in a SCSI_Pass_Trough_Direct data structure, and that data structure causes the CDB to be passed without modification by the File System Driver 14a to the Class Driver 14b. Additional details on the structure of the CDB are described herein in conjunction with FIG. 5, and additional details on the structure of SCSI_Pass_Through_Direct are described herein in conjunction with FIG. 6.

Class Driver 14b also selectively performs one of two different operations which are indicated by reference numerals 14b-1 and 14b-2. By operation 14b-1, the class driver receives the intermediate level commands which are generated by the File System Driver 14a in mode 14a-1, and it converts those commands to one or more low level CDB's which are sent to the SCSI port wrapper 14c. In comparison, by operation 14b-2, the class driver 14b receives the CDB's in the SCSI_Pass_Through_Direct data structure from the file system driver 14a, and it causes the CDB's to be passed without modification to the SCSI port wrapper 14c.

SCSI port wrapper 14c receives the CDB's from the class driver 14b, and it re-packages those CDB's in another data structure called a SCSI Request Block (SRB). This operation is indicated in FIG. 2 by reference numeral 14c-1. Then, the CDB's in the SRB data structure are sent by the SCSI port wrapper 14c to the SCSI Mini-Port Driver 14d. Additional details on the structure of the SRB are described herein in conjunction with FIG. 7.

SCSI Mini-Port Driver 14d receives the CDB's in the SRB data structure from the SCSI port wrapper 14c. Then in response, the SCSI Mini-Port Driver 14d operates in conjunction with the SCSI adapter card 22 to send signals on the SCSI bus 21 which cause the CD-ROM reader to perform the command that is specified by the CDB. This operation is indicated in FIG. 2 by reference numeral 14d-1.

When the NT operating system initiates a read on the CD-ROM reader 20, it uses the operations 14a-1, 14b-1, 14c-1, and 14d-1 in FIG. 2 to generate and send CDB's to the SCSI mini-port driver 14d. By comparison, when the A-Series operating system initiates a read on the CD-ROM reader 20, it generates its own CDB's and it uses the operations 14a-2, 14b-2, 14c-1 and 14d-1 in FIG. 2 to send the CDB's to the SCSI mini-port driver 14d.

Figure 3A:
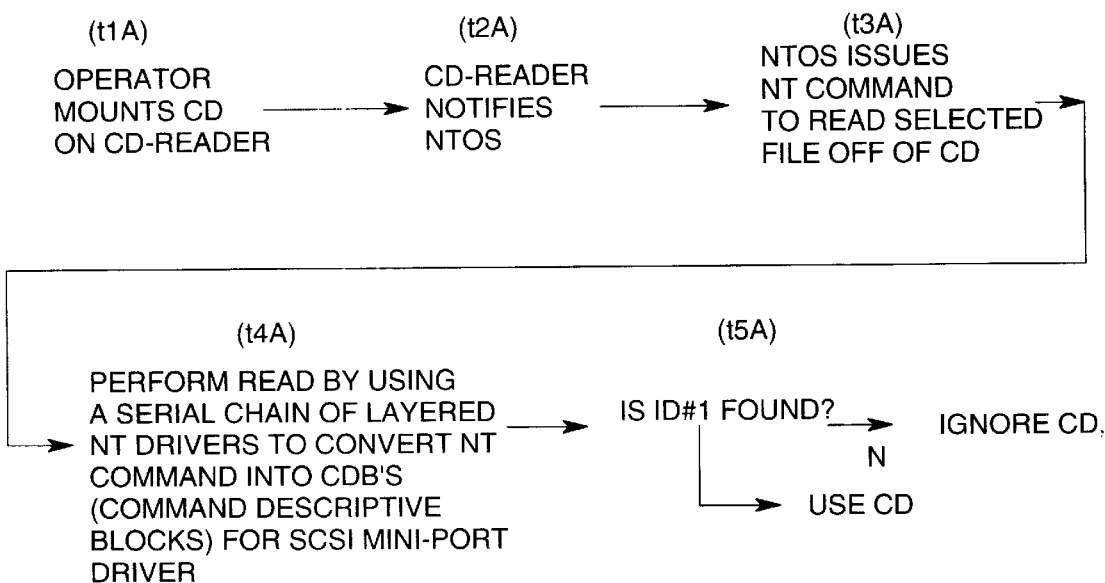
FIGS. 3A and 3B show two different time sequences, during which the host operating system and the foreign operating system of FIG. 1 start to use the shared I/O device.

Next, with reference to FIGS. 3A and 3B, two different time sequences will be described during which the NT operating system 14 and A-Series operating system 16 start to use the CD-ROM reader 20. Initially, at time t1A in FIG. 3A, an operator mounts either an NT CD 20a or an A-Series CD 20b on the CD-ROM reader 20. In response, at time t2A, the CD-ROM reader 20 notifies the NT operating system 14 that a CD has been mounted. Then, at time t3A, the NT operating system 14 issues a Read NT File command which addresses a particular file on the CD. Then the Read NT Read File command is converted to CDB's via the FIG. 2 operations 14a-1 and 14b-1 as described above; and this occurs at time t4A.

When the addressed file on the CD is received by the NT operating system 14, that file is examined for a first particular identifier ID#1. This occurs at time t5A. If the identifier ID#1 is found, then the NT operating system 14 recognizes the CD in the CD-ROM reader 20 is an NT CD 20a; and it then uses that CD as a source of information for the NT operating system. Otherwise, if the identifier ID#1 is not found, the NT operating system 14 terminates its use of the CD-ROM reader 20.

In comparison, the A-Series operating system 16 initiates its use of the CD-ROM reader 20 when a periodic time-out occurs in the emulator 15-i. This time-out occurs in FIG. 3B at time t1B. In response to that time-out, the emulator 15-i asks the NT operating system 14 if a CD was mounted on the CD-ROM reader 20 after the last time-out occurred. If no such mounting took place, the operation of the emulator continues with other tasks. Otherwise, at time t3B in FIG. 3B, the emulator causes the A-Series operating system 16 to issue a sequence of CDB's which read a selected file off the CD.

Figure 3B:
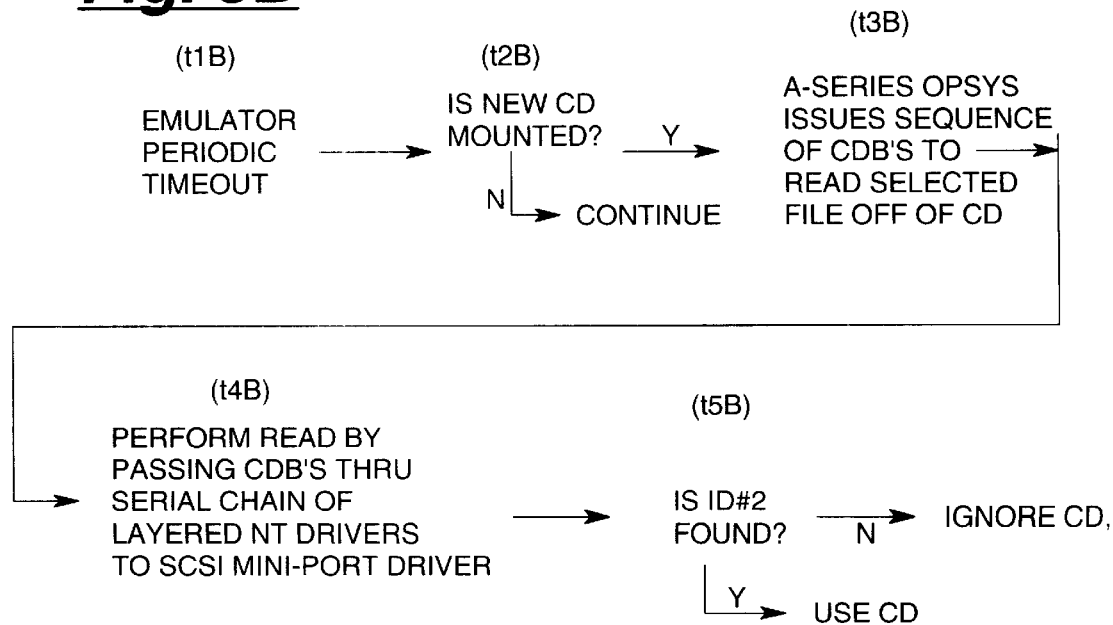

This sequence of CDB's from the A-Series operating system is performed via the FIG. 2 operations 14a-2, 14b-2, 14c-1, and 14d-1; and that occurs at time t4B in FIG. 3B. Then at time t5B, the A-Series operating system 16 receives and examines the file which it addressed from the CD. If that file does not contain a second particular identifier ID#2, then the A-Series operating system 16 terminates its use of the CD-ROM reader 20. But, if the identifier ID#2 is found, then the A-Series operating system 16 recognizes the CD in the CD-RON reader 20 as an A-Series CD 20b; and so it uses that CD as a source of information for the A-Series operating system.

Figure 4A:
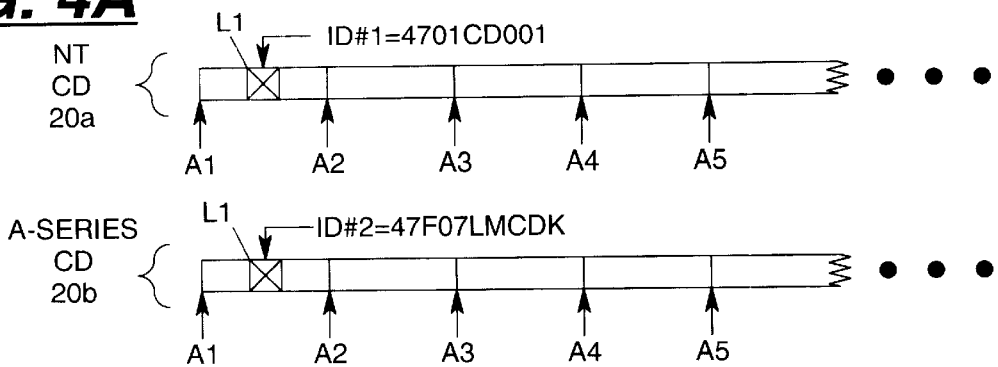
FIGS. 4A–4D show four alternative pairs of identifiers ID #1 and ID#2 on a removable data storage media for the shared I/O device of FIG. 1, which indicate whether the media is for exclusive use by the host operating system or the foreign operating system.

Referring next to FIGS. 4A–4D, they show four alternative structures by which the NT CD 20a and the A-Series CD 20b are distinguished from each other. In FIG. 4A, both the NT CD 20a and the A-Series CD 20b contain a series of addressable records of the same size. The first record begins with address A1; the second record begins with address A2; etc. Also, in FIG. 4A, the identifiers ID#1 and ID#2 both start at the same location L1 within the same record. But identifier ID#1 is a different character sequence than identifier ID#2. In FIG. 4A, identifier ID#1 is shown as "4701cd001" as an example, and identifier #2 is shown as "47f07LMCDK" as an example.

Figure 4B:
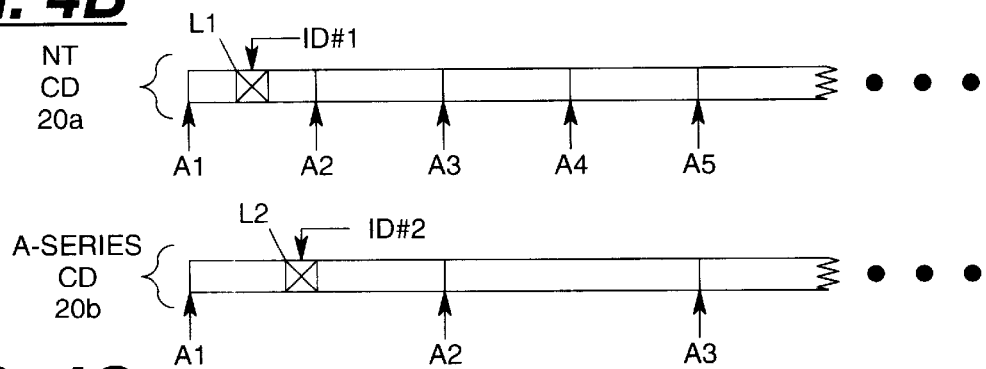

In FIG. 4B, the NT CD 20a and the A-Series CD 20b contain a series of addressable records that are of different sizes. The first record begins with address A1; the second record begins with address A2; etc. But in FIG. 4B, identifier ID#1 for the NT CD 20a begins at location L1 within the first record; whereas identifier ID#2 for the A-Series CD 20b begins at a different location within the first record. Thus, the identifiers ID#1 and ID#2 can be the same or different character sequences.

Figure 4C:
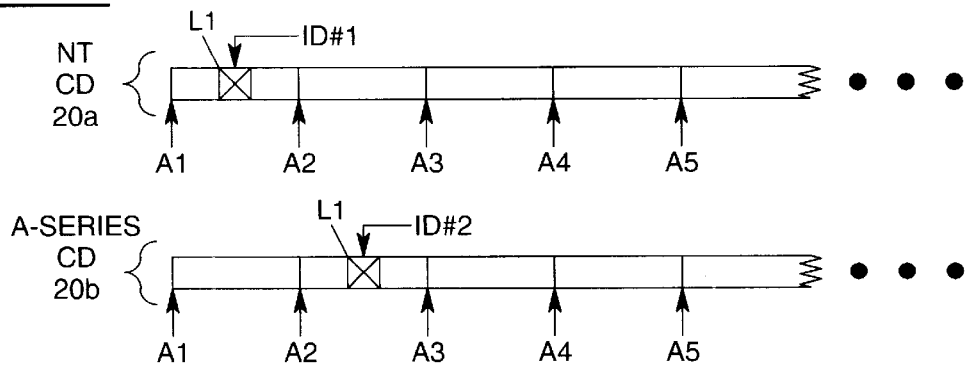

In FIG. 4C, both the NT CD 20a and the A-Series CD 20b contain a series of addressable records of the same size. The first records begins with address A1; the second record begins with address A2; etc. But in FIG. 4C, identifier ID#1 for the NT CD begins at location L1 within the first record; whereas identifier ID#2 for the A-Series CD 20b begins at the same location L1 within a different record.

Figure 4D:
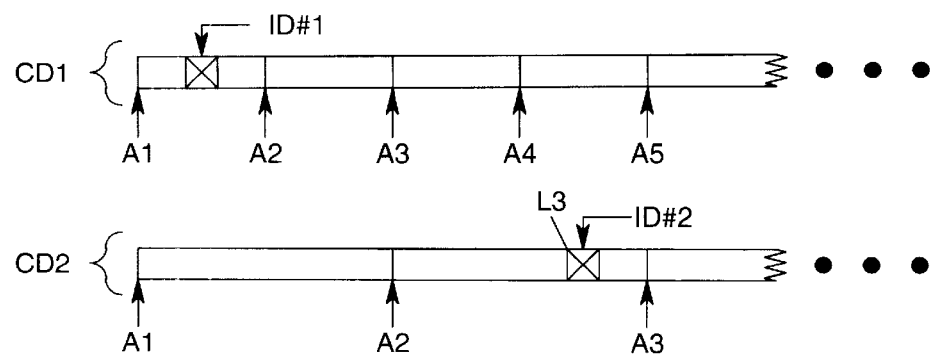

In FIG. 4D, the NT CD 20a and the A-Series CD 20b contain a series of addressable records that are of different sizes. The first record begins with address A1; the second record begins with address A2; etc. But in FIG. 4D, identifier ID#1 for the NT CD begins at location L1 within the first record; whereas, identifier ID#2 for the A-Series CD 20b begins at a different location L3 within a different record.

Turning now to FIG. 5, it shows the details of a typical ten-byte CDB. That CDB includes several members which are the "Operation Code", "Logical Unit Number", etc., as is shown in FIG. 5. Each of those members has a certain meaning, which is stated below in Table 1.

TABLE 1

Operation Code

Specifies a command which the CD-ROM reader 20 is to perform.
Logical Unit Number Indicates the logical unit number of the CD-ROM reader 20.
Logical Block Address Identifies the logical block address of the record on the CD which is to be processed via the operation code.
Transfer Length Specifies the amount of data to be transferred.
Parameter List Length Indicates the number of bytes to be sent during the Data Out phase.
Allocation Length Specifies the maximum number of bytes that an initiator has allocated to be returned.
Control Byte Indicates various flags used for commands.

Next, with reference to FIG. 6, additional details of the SCSI_Pass_Through_Direct data structure will be described. That data structure includes several members which are the "Length", "ScsiStatus", etc., as is shown in FIG. 6. Each of those members has a certain meaning, which is stated below in Table 2.

TABLE 2

Length

Specifies the size in bytes of this structure.
ScsiStatus

Returns the SCSI status that was returned by the HBA or target device. If the statu2 is not SUCCESS, the miniport driver should set the SrbStatus member to SRB_STATUS_ERROR.
PathId

Indicates the SCSI port or bus for the request. This value is zero-based.
TargetId

Indicates the target controller or device on the bus.
Lun

Indicates the logical unit number of the device.
CdbLength

Indicates the size in bytes of the SCSI command descriptor block.
SenseInfoBufferLength

Indicates the size in bytes of the request-sense buffer.
DataIn

Indicates direction of data transfer.
DataTransferLength

Indicates the size in bytes of the data buffer. If an underrun occurs, the miniport must update this member to the number of bytes actually transferred.
TimeOutValue

Indicates the interval in seconds that the request can execute before the OS-specific port driver might consider it timed out. Miniport drivers are not required to time requests because the port driver already does.
DataBuffer

Points to the data buffer. Miniport drivers should not use this value as a data pointer unless the miniport set MapBuffers to TRUE in the PORT_CONFIGURATION_INFORMATION for the HBA. In the case of SRB_FUNCTION_IO_CONTROL requests, however, miniport drivers can use this value as a data pointer regardless of the value of MapBuffers.
SenseInfoOffset

Offset to the request-sense buffer.
Cdb

Specifies the SCSI-II command descriptor block to be sent to the target device.

Next, with reference to FIG. 7, the details of the SCSI Request Block will be described. That data structure includes several members which are the "length", "function", etc., as is shown in FIG. 7. Each of those members has a certain meaning, which is stated below in Table 3.

TABLE 3

Length

Specifies the size in bytes of this structure.
Function

Specifies the operation to be performed.

TABLE 3-continued

SrbStatus

Indicates various types of errors which can occur during the execution of an SRB.
ScsiStatus

Returns the SCSI status that was returned by the target device.
PathId

Indicates the SCSI port or bus for the request.
TargetId

Indicates the target device on the bus.
Lun

Indicates the logical unit number of the device.
QueueTag

Is the queue-tag value assigned by the OS-specific port driver.
QueueAction

Indicates the tagged-queuing message to be used.
CdbLength

Indicates the size in bytes of the SCSI command descriptor block.
SenseInfoBufferLength

Indicates the size in bytes of the request-sense buffer.
SrbFlags

Indicates various parameters and options about the request.
DataTransferLength

Indicates the size in bytes of the data buffer.
TimeOutValue

Indicates the interval in seconds that the request can execute before the OS-specific port driver might consider it timed-out.
DataBuffer

Points to the data buffer.
SenseInfoBuffer

Points to the request-sense buffer.
NextSrb

Indicates the SCSI_REQUEST_BLOCK to which this request applies.
OriginalRequest

Points to the IRP for this request.
SrbExtension

Points to the Srb extension.
QueueSortKey

Specifies the offset from the start of the media or zero, depending on the type of the target device.
Cdb

Specifies the SCSI command descriptor block to be sent to the target device.

A preferred method of sharing a CD-ROM reader between two different operating system in a single computer via the present invention has now been described in detail. However, as one modification, the NT operating system 14 in FIG. 1 can be replaced with another host operating system under which all of the programs within the memory 12 run. Similarly, the A-Series operating system 16 and the A-Series emulator 14-i within FIG. 1 can be replaced with another foreign operating system and corresponding emulator which run under the host operating system. For example, the NT operating system 14 could be replaced with a UNIX operating system or an OS/2 operating system; the A-Series operating system 16 could be replaced with a MCP/AX operating system; and the A-Series emulator 15-i could be replaced with a V-Series emulator.

As another modification, the CD-ROM reader 20 that is shared between the two operating systems can be replaced with another I/O device which reads different type of a removable data storage media. For example, the CD-ROM reader 20 which reads an optical data storage media can be replaced with an I/O device which reads any type of removable magnetic data storage media or semiconductor data storage media.

As another modification, the I/O device which is shared between the host operating system and the foreign operating system can be coupled to those operating systems via any type of I/O bus and corresponding adapter card. For example, in FIG. 1, the SCSI bus 21 can be replaced with an IDE bus, and the SCSI adapter card 22 can be replaced with another adapter card which couples the IDE bus to the x86 bus 13.

Accordingly, since many such modifications can be made to the illustrated preferred embodiment, it is to be understood that the invention is not limited to just that one embodiment but is defined by the appended claims.

What is claimed is:

1. A method of sharing an I/O device between a host operating system and a foreign operating system which runs under said host operating system in a single computer, where said I/O device accepts removable data storage media and includes a device driver which receives device commands for reading addressable fields on said media; said method including the steps of:

attempting to find a first identifier in a field on said media by generating one set of said device commands, via a serial chain of layered drivers within said host operating system, and sending them to said device driver;

using said media as a source of data for said host operating system only if said first identifier is found on said media;

attempting to find a second identifier in a field on said media by passing a another set of said device commands from said foreign operating system thru said layered drivers in said host operating system to said device driver; and, using said media as a source of data for said foreign operating system only if said second identifier is found on said media.

2. A method according to claim 1 wherein said first identifier is stored on one data storage media at a particular location within a field that has a predetermined address; and said second identifier is stored on another data storage media at the same location within a field that has the same address.

3. A method according to claim 1 wherein said first identifier is stored on one data storage media at a particular location within a field that has a predetermined address; and said second identifier is stored on another data storage media at a different location within a field that has the same address.

4. A method according to claim 1 wherein said first identifier is stored on one data storage media at a particular location within a field that has a predetermined address; and said second identifier is stored on another data storage media at the same location within a field that has a different address.

5. A method according to claim 1 wherein said first identifier is stored on one data storage media at a particular location within a field that has a predetermined address; and said second identifier is stored on another data storage media at a different location within a field that has a different address.

6. A method according to claim 1 wherein said removable data storage media is an optical media.

7. A method according to claim 1 wherein said removable data storage media is a magnetic media.

8. A method according to claim 1 wherein said removable data storage media is a semiconductor media.

9. A method according to claim 1 and further including the step of providing an emulator program in said computer which receives said another set of device commands from said foreign operating system and places them in a larger structure which facilitates their passage thru said host operating system.

10. A method according to claim 9 wherein said device driver is a SCSI mini-port driver and said device commands are SCSI command descriptor blocks.

11. A method according to claim 9 wherein said device driver is an IDE mini-port driver and said device commands SCSI command descriptor blocks.

12. A method according to claim 9 wherein said foreign operating system uses said media, if said second identifier is found, as a source for an application program that runs under said foreign operating system.

13. A method according to claim 9 wherein said foreign operating system uses said media, if said second identifier is found, as a source for help data for an application program that runs under said foreign operating system.

14. A method according to claim 9 wherein said foreign operating system uses said media, if said second identifier is found, as a source for security keys that enable said foreign operating system to perform certain protected functions.

15. A method of sharing an I/O device between a host operating system and a foreign operating system which run concurrently in a single computer, where said I/O device accepts removable data storage media and includes a device driver which receives device commands for reading selectable fields on said media; said method including the steps of:

generating one set of said device commands, within a serial chain of layered drivers in said host operating system, which reads a selectable field on said media and sending those commands to said device driver;

using said media as a source of data for said host operating system only if a first identifier is present in the field which said one set of device commands select;

passing another set of said device commands, from said foreign operating system thru said serial chain of layered drivers in said host operating system to said device driver, which reads a selected field on said media; and, using said media as a source of data for said foreign operating system only if a second identifier is present in the field which said another set of device commands select.

* * * * *